Feb. 29, 1944.                R. L. OHLS                2,342,963
                                VALVE
                          Filed May 4, 1942
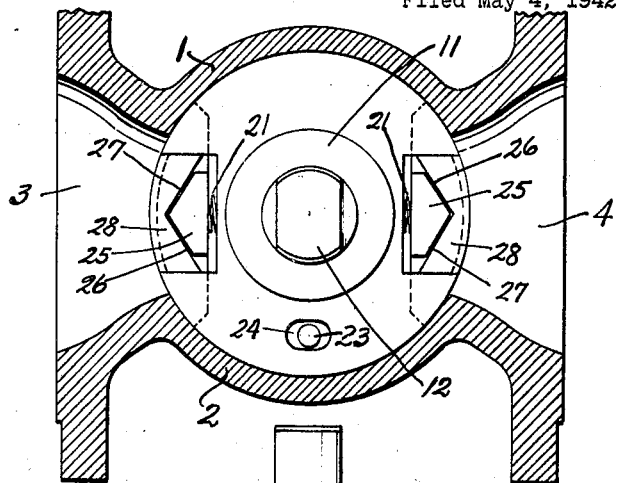
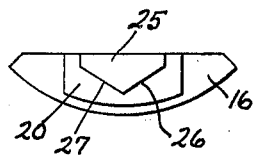
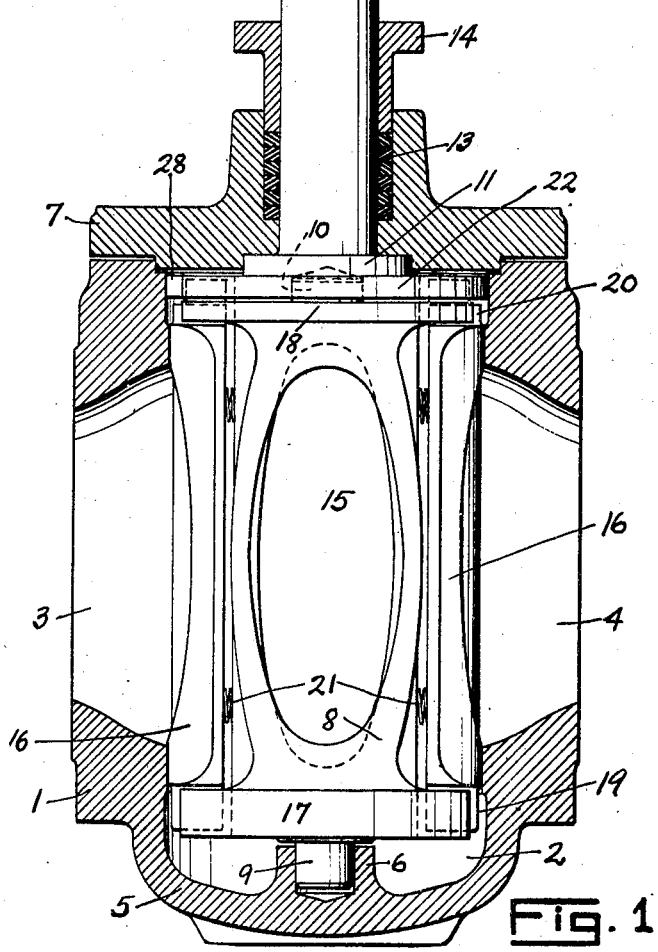
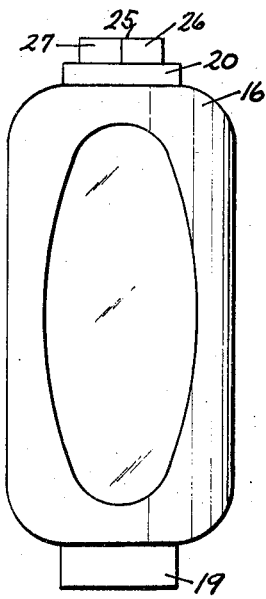
ROBERT L. OHLS.
INVENTOR.

Patented Feb. 29, 1944

2,342,963

UNITED STATES PATENT OFFICE 2,342,963

VALVE

Robert L. Ohls, Houston, Tex., assignor to Reed Roller Bit Company, Houston, Tex., a corporation of Texas Application May 4, 1942, Serial No. 441,575

11 Claims. (Cl. 251—102)

The present invention relates generally to valves for use in conduits carrying fluids under high pressures and more particularly has reference to valves of the modified plug type provided with closure members which are retractible from the wall of the valve chamber to facilitate displacement thereof. More particularly the present invention is directed to means for effecting the retraction of the closure members from the wall of the valve chamber.

A number of valve constructions have been devised which include various means for effecting the retraction of retractible closures from the wall of a valve chamber. In spite of the many constructions developed for accomplishing the above purpose, there are still many objections to the existing structures particularly as to the effectiveness of the retraction and the ease in which the retraction may be effected.

The general object of the present invention is to provide a valve with a retractible closure member and simplified means for effecting the retraction of said closure member.

A more specific object of this invention is to provide in a valve having a retractible closure member wedge means for insertion between the wall of the valve chamber and a part of the closure member to effect the retraction of the closure member from the wall of said valve chamber.

Still another object of this invention is to provide a valve having a retractible closure member actuated by a rotary carrier and circumferentially displaceable wedge means for insertion between a part of the closure member and the wall of the valve chamber for breaking said closure member away from the wall of said valve chamber.

A still further object of this invention is to provide a valve construction in which a rotary carrier member is mounted in a valve chamber and a closure member mounted on the carrier is retractible from the wall of the valve chamber, means having a lost motion connection with the carrier member for effecting rotation thereof, and a radially movable wedging element carried by the carrier rotating member for insertion between a part of the closure member and the wall of the valve chamber to break said closure member away from the wall of the valve chamber during circumferential movement of the wedge member upon taking up of lost motion between the carrier rotating member and the carrier.

Other objects and features of the present invention will become more apparent from the following description and the figures illustrated in the drawing.

In the drawing:

Figure 1 is a fragmentary sectional view of a valve constructed in accordance with the present invention, Fig. 2 is another sectional view of the valve shown in Fig. 1 taken on a plane transversely of the axis of the actuating stem thereof, Fig. 3 is an elevational view of a closure member employed in the valve of the present invention, and Fig. 4 is a plan view of the closure member illustrated in Fig. 3.

As illustrated in the drawing, the valve of the present invention comprises a valve body 1 having a cylindrical bore 2 forming a valve chamber. The wall of the valve chamber is provided with ports opening into ducts 3 and 4 either of which may serve for the inflow or outflow of fluid into and out of the valve chamber 2, the direction of flow being immaterial to the operation of the valve.

At its lower end the cylindrical bore 2 is closed by a closure 5 which is shown as integral with the body 1 and which is provided on its interior surface with a bored boss 6 serving as a bearing for the valve carrier hereinafter described.

As more clearly shown in Fig. 1, the upper end of the valve chamber 2 in body 1 is closed by a detachable cover or bonnet 7 which may be secured and sealed in place by any suitable means common in the art but not shown in the drawing. The bonnet has an opening in the center thereof in axial alignment with the bearing 6 and serves as a bearing for the stem of the actuating member of the carrier hereinafter described.

A closure carrier 8 is rotatably mounted in the valve chamber and for this purpose is provided with an axially extending pin 9 on one end positioned in the bearing 6 and with a second axially extending pin 10 positioned in an axial socket of a closure carrier actuator 11. An axial stem 12 projects from the carrier actuator through the opening in the bonnet 7. Part of the opening in the bonnet is enlarged to form a stuffing box containing packing material 13 which is compressed by a plunger 14.

The carrier 8, and carrier actuator 11 are retained in assembled relation in position in the valve chamber by means of the bonnet 7.

Closure carrier 8 comprises a body having a flow passage 15 extending transversely therethrough and adapted to be brought in register with the ports in the valve chamber wall to permit free and unrestricted flow between and through the ducts 3 and 4. On each side of the flow passage 15 the carrier is flattened to provide a space between the carrier and the wall of the valve chamber for the segmental closure members 16. At the end adjacent pin 9, carrier 8 is provided with a disc-like flange 17 and at its other end with a similar flange 18. These flanges are provided with aligned radial slots (see Fig. 2) in which the end lugs 19 and 20 of the segmental closure members 16 are mounted. The slots are just wide enough to provide a sliding fit with said lugs to permit radial displacement of the segmental closure members 16. Springs 21 are provided to urge the closure members against the wall of the valve chamber and into seating position.

The carrier actuating member 11 has a disc-like flange 22 juxtaposed to the flange 18 of the carrier and rotary motion of the actuator is transmitted to the carrier through the flanges 22 and 18 by means of a lost-motion connection in the form of a pin 23 fixed in the flange 18 and extending into the slot 24 in the flange 22. The purpose of this lost-motion connection will appear hereinafter.

Flange 22 is provided with radial slots similar to those in the flanges 17 and 18 and the lugs 20 of the closure members are provided with extensions 25 which project axially into the slots in said flange 22. The width of the slots in flange 22 is the same as that of the slots in the flanges 17 and 18 but the width of the extensions 25 is less than that of the lugs 20. This provides sufficient clearance between the extensions 25 and the radial slots in the flange 22 to enable the latter to be rotated to take up the lost motion between the pin 23 and slot 24 without the sides of the extensions 25 engaging the sides of the radial slots in the flange 22.

The extensions 25 are provided with angularly disposed cam faces 26 and 27 on the side thereof facing the wall of the valve chamber or relief bore which in this instance is of slightly larger diameter than that of the valve chamber.

Positioned in each slot in flange 22 is a double, or two way wedge 28. As shown in Fig. 2 this wedge lies between the wall of the valve chamber or relief bore and the cam surfaces 26 and 27 of the extension 25. The outer surface of the wedge is cylindrical and of the same radius as that of the relief bore and slides on the wall of this bore when the flange 22 is turned. Wedge 28 is of a length equal to the width of the slot and may slide radially therein. Said wedge is of an axial dimension equal to that of the flange 22 and since it rides on top of the lug 20 it cannot be displaced to enter the slot in the flange 18.

As before stated the carrier 8 and carrier actuator 11 are held in alignment by a pin at the upper end of the carrier which fits snugly into a hole on the bottom of the actuator. It may also be advantageous to machine the diameters of the actuator flange 22 and the upper segment carrier flange 18 to such a diameter that there will be only a sliding fit between these parts and the valve body relief bore. This may insure better alignment of the internal parts of the valve.

As the valve stem 12 is rotated through its first few degrees of rotation in taking up lost motion between pin 23 and slot 24 one half of each of the two wedges force the tops of the closure members inward, overcoming the closure member springs and fluid pressures. Then as the stem rotation continues the stem flange slot 24 will engage the pin 23 in the upper flange of the carrier 8, and rotate the carrier with it. The carrier 8 in turn will carry the closure members around to the desired position while the top ends of the closure members are pushed inward and the bottom ends slide on the valve body. When the closure members have reached the desired position the valve stem is backed off a few degrees to release the wedges from the top ends of the closure members and allow the latter to bear against the wall of the valve body bore. When the valve stem is rotated in the opposite direction to that outlined above, the other half of each wedge comes into action and produces the same results.

The valve herein described provides a simple construction that may be readily assembled and taken down for repair. Also the floating arrangement of the wedge members serves to facilitate retraction of the closure members by applying the wedging force directly between the closure members and the wall of the relief bore which is an integral part of the valve chamber.

Having described my invention, I claim:

1. A valve comprising a valve body having a ported valve chamber, a carrier movable in said chamber, a closure member for closing said port, cooperating means on the carrier and closure member for moving the closure member upon movement of the carrier, means for moving the carrier and having a lost-motion connection therewith, said carrier moving means having a slot formed therein, cam means on the closure member extending into said slot, and cam means in said slot cooperating with the cam means on the closure member for retracting said closure member from the wall of the valve chamber during movement of the carrier moving means in taking up lost motion between said carrier and the carrier moving means.

2. A valve comprising a valve body having a ported valve chamber, a carrier movable in said chamber, a closure member for closing said port, cooperating means on the carrier and closure member for moving the closure member upon movement of the carrier, means for moving the carrier and having a lost-motion connection therewith, said carrier moving means having a slot formed therein, cam means on the closure member extending into said slot, and wedge means loosely mounted in said slot and bearing on the wall of said valve chamber for engaging the cam means on the closure member to retract the closure member from the wall of the valve chamber during movement of the carrier moving means in taking up lost motion between said carrier and the carrier moving means.

3. A valve comprising a valve body having a ported valve chamber therein, a carrier rotatably mounted in said chamber, a closure member associated with said carrier for displacement by said carrier to and from positions in said valve chamber to close and open the port therein, said closure member being retractible from the wall of said valve chamber, actuating means at one end of the valve chamber having a lost-motion connection with the carrier for effecting rotation of said carrier, said actuating means having a radially extending slot formed therein, lug means on the corresponding end of the closure member extending axially into said slot, and wedge means in said slot between the wall of the valve chamber and the lug means on the closure member and displaceable by said actuating means during the taking up of lost motion between said actuating means and the carrier for prying the closure member away from the wall of the valve chamber.

4. A valve comprising a valve body having a ported valve chamber therein, a carrier rotatably mounted in said chamber, a closure member associated with said carrier for displacement by said carrier to and from positions in said valve chamber to close and open the port therein, said closure member being retractible from the wall of said valve chamber, actuating means at one end of the valve chamber having a lost-motion connection with the carrier for effecting rotation of said carrier, said actuating means having a radially extending slot formed therein, lug means on the corresponding end of the closure member extending axially into said slot, and wedge means in said slot between the wall of the valve chamber and the lug means on the closure member and displaceable by said actuating means during the taking up of lost motion between said actuating means and the carrier for prying the closure member away from the wall of the valve chamber, said wedge means being loosely mounted in said slot for radial movement therein and bearing on the wall of said valve chamber during displacement by said actuating means for prying the closure member away from the wall of the valve chamber.

5. A valve comprising a valve body having a ported valve chamber therein, a carrier rotatably mounted in said chamber and provided with disc-like flanges at each end thereof provided with radial slots, a closure member positioned in said valve chamber and having radially extending lugs at each end thereof positioned in the slots in the carrier, flanges for mounting said closure member on said carrier and for permitting retraction of the closure member from the wall of said valve chamber, an actuating member having a lost-motion connection with one end of the carrier and having a disc-like flange juxtaposed to the flange on the adjacent end of the carrier, a flange of the actuating member being provided with a radial slot, a projection on the adjacent lug of the closure member extending axially into the slot of the actuating member, the width of said projection being less than the width of said slot to permit circumferential movement of said projection within said slot, and wedging means in said slot between the wall of the valve chamber and the projection on the closure member for retracting the closure member from the wall of the valve chamber during taking up of lost motion between the carrier and carrier actuating member.

6. A valve comprising a valve body having a ported valve chamber, a carrier movable in said chamber, a closure member for closing said port, cooperating means on the carrier and closure member for moving the closure member upon movement of the carrier, means for moving the carrier and having a lost-motion connection therewith, said closure member having a portion spaced from the wall of the valve chamber, and wedge means loosely carried by the carrier moving means and circumferentially movable during the taking up of lost motion between the carrier and carrier moving means between the wall of the valve chamber and the portion of the closure member spaced from the wall of said valve chamber for breaking the closure member away from the wall of the valve chamber.

7. A valve comprising a valve body having a ported valve chamber, a carrier movable in said chamber, a closure member for closing said port, cooperating means on the carrier and closure member for moving the closure member upon movement of the carrier, means for moving the carrier and having a lost-motion connection therewith, said closure member having a portion spaced from the wall of said valve chamber, and wedge means laterally displaceable relative to said actuating means and movable by said actuating means between the wall of the valve chamber and the portion of the closure member spaced from said wall for breaking the closure member away from the wall of the valve chamber.

8. A valve comprising a valve body having a ported valve chamber therein, a carrier rotatably mounted in said chamber, a closure member associated with said carrier for displacement by said carrier to and from positions in said valve chamber to close and open the port therein, said closure member being retractable from the wall of said valve chamber, actuating means at one end of the valve chamber having a lost-motion connection with the carrier for effecting rotation of said carrier, said closure member having a portion spaced from the wall of said valve chamber, and wedge means radially displaceable relative to said actuating means and movable by said actuating means for circumferential movement between the wall of the valve chamber and the portion of the closure member spaced from said wall for breaking the closure member away from the wall of the valve chamber.

9. A valve comprising a valve body having a ported valve chamber therein, a carrier rotatably mounted in said chamber and provided with disc-like flanges at each end thereof provided with radial slots, a closure member positioned in said valve chamber and having radially extending lugs at each end thereof positioned in the slots in the carrier, flanges for mounting said closure member on said carrier and for permitting retraction of the closure member from the wall of said valve chamber, an actuating member having a lost-motion connection with one end of the carrier and having a disc-like flange juxtaposed to the flange on the adjacent end of the carrier, the flange of the actuating member being provided with a radial slot, a projection on the adjacent lug of the closure member extending axially into the slot of the flange of the actuating member, the width of said projection being less than the width of said slot to permit circumferential movement of said projection within said slot, and wedging means in said slot between the wall of the valve chamber and the projection on the closure member, said wedging means having a V-shaped notch in the surface facing the projection on the closure member and a segmental cylindrical surface in engagement with the wall of the valve chamber, said wedging means being circumferentially displaceable by the actuating member during the taking up of lost motion between the carrier and said carrier actuating member for breaking the closure member away from the wall of the valve chamber.

10. A valve comprising a valve body having a ported valve chamber therein, a carrier rotatably mounted in said chamber and provided with disc-like flanges at each end thereof provided with radial slots, a closure member positioned in said valve chamber and having radially extending lugs at each end thereof positioned in the slots in the carrier, flanges for mounting said closure member on said carrier and for permitting retraction of the closure member from the wall of said valve chamber, an actuating member having a lost-motion connection with one end of the carrier and having a disc-like flange juxtaposed to the flange on the adjacent end of the carrier, the flange of the actuating member being provided with a radial slot, a projection on the adjacent lug of the closure member extending axially into the slot of the flange of the actuating member, the width of said projection being less than the width of said slot to permit circumferential movement of said projection within said slot, said projection having a double cam surface facing the wall of the valve chamber, and double wedging means in said slot between the wall of the valve chamber and the double cam surface on the projection of the closure member for retracting the closure member from the wall of the valve chamber during taking up of lost motion between the carrier actuating member and carrier in either direction of rotation.

11. A valve comprising a valve body having a ported valve chamber, a closure member movable circumferentially within said chamber to close and open said port, a floating wedge movable both radially and circumferentially with respect to the chamber and the closure member, and operating means for moving the closure member and having a lost motion connection with the closure member and an operating connection with the wedge, said means being adapted on initial movement to force said wedge between the chamber wall and a portion of said closure member to break the closure member away from the chamber wall and on continued movement to move said closure circumferentially to close or open the port.

ROBERT L. OHLS.